(12) United States Patent
Shen et al.

(10) Patent No.: US 12,496,166 B2
(45) Date of Patent: Dec. 16, 2025

(54) ORTHODONTIC APPLIANCE AND USES THEREOF

(71) Applicants: Shanghai Smartee Denti-Technology Co., Ltd., Shanghai (CN); Gang Shen, Shanghai (CN); Taikang Bybo Dental Group Co., Ltd., Guangdong (CN)

(72) Inventors: Gang Shen, Shanghai (CN); Tao Guo, Shanghai (CN); Ziqing Xu, Shanghai (CN); Jianyu Jiang, Shanghai (CN); Te Wang, Shanghai (CN); Xingxing Wang, Shanghai (CN); Huimin Zhuang, Shanghai (CN); Sensen Yang, Shanghai (CN); Gang Wu, Shanghai (CN); Ruixue Zhou, Shanghai (CN)

(73) Assignee: SHANGHAI SMARTEE DENTI-TECHNOLOGY CO., LTD., Shanghai (CN)

( * ) Notice: Subject to any disclaimer, the term of this patent is extended or adjusted under 35 U.S.C. 154(b) by 625 days.

(21) Appl. No.: 17/822,262

(22) Filed: Aug. 25, 2022

(65) Prior Publication Data
US 2022/0401188 A1    Dec. 22, 2022

Related U.S. Application Data

(63) Continuation of application No. PCT/CN2021/078205, filed on Feb. 26, 2021.

(30) Foreign Application Priority Data

Feb. 26, 2020  (CN) .......................... 202010121302.X
Feb. 26, 2020  (CN) .......................... 202020213787.0

(51) Int. Cl.
*A61C 7/08*     (2006.01)
*A61C 13/00*    (2006.01)

(52) U.S. Cl.
CPC ............ *A61C 7/08* (2013.01); *A61C 13/0004* (2013.01)

(58) Field of Classification Search
CPC .................................... A61C 7/08; A61C 7/10
(Continued)

(56) References Cited

U.S. PATENT DOCUMENTS 6,626,180 B1 *   9/2003   Kittelsen .............. A63B 71/085
                                                            128/862
10,993,783 B2 *  5/2021   Wu ..................... A61C 13/0004
(Continued)

FOREIGN PATENT DOCUMENTS

CN     101677841 A    3/2010
CN     202113175 U    1/2012
(Continued)

OTHER PUBLICATIONS

Shanghai Smartee Denti-Technology Co., Ltd., et al., Extended European Search Report, EP 21760260.6, Jul. 5, 2023, 7 pgs.
(Continued)

*Primary Examiner* — Matthew M Nelson
(74) *Attorney, Agent, or Firm* — Nicholas Mesiti, Esq.; Heslin Rothenberg Farley & Mesiti P.C.

(57) ABSTRACT

An orthodontic appliance and uses thereof are disclosed. The first orthodontic appliance includes a shell-like body at least having a geometric structure allowing at least one tooth in a posterior region to move in a distal direction. The shell-like body is further provided with an auxiliary anchoring portion capable of absorbing a reaction force generated by the at least one tooth in the posterior region while moving in the distal direction. Provided between the shell-like body and the auxiliary anchoring portion is an auxiliary transmitting portion used for aiding transmission of the reaction force
(Continued)

generated by the at least one tooth in the posterior region while moving in the distal direction.

18 Claims, 6 Drawing Sheets

(58) Field of Classification Search
USPC .................................................. 433/6
See application file for complete search history.

(56) References Cited

U.S. PATENT DOCUMENTS

| | | | |
|---|---|---|---|
| 11,026,831 B2* | 6/2021 | Kuo | A61C 7/08 |
| 11,534,974 B2* | 12/2022 | O'Leary | B33Y 10/00 |
| 2005/0037312 A1* | 2/2005 | Uchida | A61C 7/00 |
| | | | 433/18 |
| 2011/0308532 A1 | 12/2011 | Nelissen | |
| 2012/0225398 A1 | 9/2012 | Fallah | |
| 2015/0245887 A1* | 9/2015 | Izugami | A61C 7/303 |
| | | | 433/6 |
| 2015/0257856 A1* | 9/2015 | Martz | A61C 7/145 |
| | | | 433/6 |
| 2016/0081768 A1* | 3/2016 | Kopelman | A61C 7/10 |
| | | | 433/6 |
| 2016/0081769 A1* | 3/2016 | Kimura | A61C 7/10 |
| | | | 433/7 |
| 2016/0310236 A1* | 10/2016 | Kopelman | G06F 30/00 |
| 2017/0007366 A1* | 1/2017 | Kopelman | G16H 20/40 |
| 2017/0007367 A1* | 1/2017 | Li | G16H 20/40 |
| 2018/0368944 A1* | 12/2018 | Sato | A61C 7/10 |
| 2019/0021817 A1* | 1/2019 | Sato | A61C 7/10 |
| 2019/0152152 A1* | 5/2019 | O'Leary | B33Y 30/00 |
| 2019/0262101 A1* | 8/2019 | Shanjani | A61C 7/10 |
| 2022/0202538 A1* | 6/2022 | Shen | A61C 7/06 |
| 2022/0401188 A1* | 12/2022 | Shen | A61C 7/08 |

FOREIGN PATENT DOCUMENTS

| | | | | |
|---|---|---|---|---|
| CN | 202235717 U | 5/2012 | | |
| CN | 202821670 U | 3/2013 | | |
| CN | 203226909 U | 10/2013 | | |
| CN | 104367386 A | 2/2015 | | |
| CN | 204306914 U | 5/2015 | | |
| CN | 105287028 A | 2/2016 | | |
| CN | 106687067 A | 5/2017 | | |
| CN | 106714726 A | 5/2017 | | |
| CN | 107530143 A | 1/2018 | | |
| CN | 107847293 A | 3/2018 | | |
| CN | 107847299 A | 3/2018 | | |
| CN | 110025388 A | 7/2019 | | |
| CN | 110141381 A | 8/2019 | | |
| CN | 110478061 A | 11/2019 | | |
| CN | 111281578 A | 6/2020 | | |
| CN | 211750177 U | 10/2020 | | |
| WO | WO-2006096558 A2 * | 9/2006 | | A61C 7/00 |
| WO | 2011022259 A2 | 2/2011 | | |
| WO | 2019069163 A1 | 4/2019 | | |

OTHER PUBLICATIONS

Shanghai Smartee Denti-Technology Co., Ltd et al., International Search Report with English translation, PCT/CN2021/078205, May 31, 2021, 7 pgs.

Shanghai Smartee Denti-Technology Co., Ltd et al., CN First Office Action with English translation, CN 202010121302.X, May 24, 2021, 12 pgs.

* cited by examiner

ORTHODONTIC APPLIANCE AND USES THEREOF

CROSS REFERENCE TO RELATED APPLICATIONS

The present application is a continuation of International Application No. PCT/CN2021/078205, filed on Feb. 26, 2021, which claims priority of Chinese patent application No. 202020213787.0 and No. 202010121302.X, filed on Feb. 26, 2020. Each of the aforementioned applications is hereby incorporated by reference in their entirety.

TECHNIC FIELD

The present disclosure relates to the technical field of medical instrument technology, and more specifically to an orthodontic appliance, a dental instrument, an orthodontic appliance set and an orthodontic system.

BACKGROUND

Malocclusion is one of three major diseases of the oral cavity, and has a high prevalence rate. Generally, malocclusion is resulted from genetic or environmental factors during growth. Malocclusion is harmful to the oral cavity and even the whole body, for example, malocclusion negatively affects maxillofacial growth, oral cavity health, oral function, and appearance. Currently, malocclusion is mainly treated through surgical operations or orthodontic appliances.

In recent years, invisible orthodontic appliances are used by more and more people due to comfort and dignity they bring to people. During an orthodontic treatment, any force applied to and moves teeth would generate in an opposite direction a force equal to the force applied. A situation that supports a reaction force caused by moving a tooth to be corrected is referred to as "anchoring". In fact, anchoring is a basis for providing an orthodontic force. Generally, in orthodontic treatment, an anchoring portion is mainly composed of non-orthodontic teeth, and the palate and alveolar can also be used as anchoring portions. Teeth in the anchoring portion are affected by an anchoring force in an opposite position generated from the orthodontic force. During an invisible orthodontic treatment, an anchoring control is generally performed by increasing a number of anchoring teeth, preparation for anchoring, intermaxillary elastic traction and implant anchoring. However, the control method has following problems. Increasing the number of anchoring teeth is only applicable to a minor number of cases. By preparation for anchoring, an increased unit cannot be accurately controlled when the number of anchors is insufficient, resulting in an uncertain orthodontic result. Because there are both maxillary (mandibular) adduction and mandibular (or maxillary) guides in the intermaxillary elastic traction and implant anchoring, there would be a side effect during use of this method. Implant anchorage requires implantation damage in patient's oral cavity, which is not acceptable to some patients, and the operation is relatively demanding for doctors. Therefore, the above control methods have some problems during a personalized orthodontic treatment. In a fixing treatment, apart from the implant anchorage among anchoring control methods, there is methods of adding two devices, a trans-palate anchorage (TPA) and a Nance arch. The methods anchor well. However, the devices have to be fixed with molars, which affects eating and oral hygiene and brings poor experience to a patient.

Therefore, it is magnificent to study for an invisible orthodontic appliance that not only can strengthen anchorage, but also brings nice experience and oral hygiene to the patient.

SUMMARY

The present disclosure provides an orthodontic appliance, a dental instrument, an orthodontic appliance set and an orthodontic system as well as a designing method and a manufacturing method of the orthodontic appliance. When worn on maxillary teeth and moving posterior teeth in a distal direction, the orthodontic appliance is able to increase anchorage of the anterior teeth to prevent the anterior teeth from tilting towards a labial side.

In one aspect, some embodiments of the present disclosure provide a first orthodontic appliance including a shell-like body provided with several cavities accommodating maxillary teeth. The shell-like body at least has a geometric structure allowing at least one tooth in a posterior region to move in a distal direction. The shell-like body is further provided with an auxiliary anchoring portion capable of absorbing a reaction force generated by the at least one tooth in the posterior region while moving in the distal direction. The auxiliary anchoring portion is connected to a lingual side in the posterior region of both left and right sides of the shell-like body.

Herein, provided between the shell-like body and the auxiliary anchoring portion is an auxiliary transmitting portion used for aiding transmission of the reaction force generated by the at least one tooth in the posterior region while moving in the distal direction. The auxiliary transmitting portion is provided between an anterior region of the shell-like body and the auxiliary anchoring portion. Alternatively, the auxiliary transmitting portion provided between the posterior region of the shell-like body and the auxiliary anchoring portion.

Herein, when the first orthodontic appliance is being worn on the maxillary teeth, the auxiliary anchoring portion is in contact with a palatal mucosa of an anterior region of a maxillary hard palate so that the anterior region of the maxillary hard palate serves as an anchorage for an anterior region or a partial anchorage for the anterior region, and the reaction force generated by the at least one tooth in the posterior region while moving in the distal direction is absorbed or partially absorbed by the maxillary hard palate.

Further, the auxiliary transmitting portion is a spacer hole provided between the shell-like body and the auxiliary anchoring portion, the spacer hole partially separating the auxiliary anchoring portion from the shell-like body.

Further, the shell-like body includes the anterior region of the shell-like body and the posterior region of the shell-like body. The auxiliary transmitting portion is provided between a left canine and a right canine in the anterior region of the shell-like body. The auxiliary transmitting portion has in a dental arch direction a length that is equal to a length of at least one tooth in the anterior region in a mesial-distal direction.

Further, the auxiliary anchoring portion includes an anchorage body provided in the anterior region of the maxillary hard palate and anchorage junctions connected with left and right sides of the shell-like body, and the left and right sides of the shell-like body are respectively provided with at least one of the anchorage junctions.

Further, when there are a plurality of anchorage junctions connected to the left side of the shell-like body and/or a plurality of anchorage junctions connected to the right side of the shell-like body, the spacer hole between the anchorage junctions is the auxiliary transmitting portion.

Further, a width of connection between each anchorage junction and the shell-like body is greater than or equal to 2 mm.

Further, the anchorage body has a surface at a side facing the anterior region of the maxillary hard palate, the surface being shaped as adaptive to a surface of the anterior region of the maxillary hard palate.

Further, the auxiliary anchoring portion is connected to a gingival margin at the lingual side or a position close to the gingival margin at the lingual side in the posterior region at both the left and right sides of the shell-like body.

Further, the position close to the gingival margin at the lingual side is a position 1/3-1/2 of a distance from a height of an entire tooth crown to the gingival margin.

Further, the shell-like body and the auxiliary anchoring portion are an integrally-formed structure or a non-integrally-formed structure.

In another aspect, some embodiments of the present disclosure provide a dental instrument including the first orthodontic appliance as described in the above and a second orthodontic appliance.

Herein, the second orthodontic appliance includes a shell-like body and a holding portion. The shell-like body is provided with several cavities accommodating maxillary teeth and has a geometric structure adducting anterior teeth. The holding portion is separately connected to a lingual side in a posterior region of both left and right sides of the shell-like body. The second orthodontic appliance is worn on the maxillary teeth after the first orthodontic appliance is off, so that in response to adduction of the anterior teeth, both left and right maxillary teeth in the posterior region integrally anchorage, and the left and right maxillary teeth in the posterior region move to right positions and stay unchanged.

Further, the holding portion is separately connected to the gingival margin at the lingual side or the position close to the gingival margin at the lingual side in the posterior region at both the left and right sides of the shell-like body.

Further, the position close to the gingival margin at the lingual side is the position 1/3-1/2 of the distance from the height of the entire tooth crown to the gingival margin.

Further, the holding portion is an arch structure having a radian consistent with a radian of an upper palate.

Further, a reinforcing portion for increasing stability is provided on the holding portion.

Further, the strengthening portion is at least one reinforcing ridge buccolingually provided and having a curvature consistent with or different from a curvature of the holding portion.

Further, a section of the reinforcing ridge along a mesial-distal direction of a sagittal plane is a discontinuous section or a continuous section.

Further, a section of a cross section of the reinforcing ridge in the mesial-distal direction is provided above and below a cross section of the holding portion, or is provided above the cross section of the holding portion, or is provided below the cross section of the holding portion.

Further, the section of the cross section of the reinforcing ridge in the mesial-distal direction is an arc or a semi-closed polygon.

Further, a length of connection between the holding portion and the shell-like body is equal to a length of a second premolar and a first molar of the shell-like body in the mesial-distal direction.

Further, the shell-like body and the holding portion are an integrally-formed structure or a non-integrally-formed structure.

An orthodontic appliance set including a maxillary orthodontic appliance and a mandibular orthodontic appliance. Herein, the maxillary orthodontic appliance is the first orthodontic appliance as described in the above, and the mandibular orthodontic appliance includes a mandibular shell-like body for accommodating mandibular teeth.

Further, the mandibular shell-like body includes a mandibular anterior region and a mandibular posterior region. The mandibular shell-like body is further provided with a mandibular support that enhances anchorage by using dental arch cortex, the mandibular support is provided in the mandibular anterior region.

Further, provided between the mandibular support and the mandibular anterior region is a mandibular gap separating the mandibular anterior region from the mandibular support.

In still another aspect, some embodiments of the present disclosure provide an orthodontic appliance set including a maxillary orthodontic appliance and a mandibular orthodontic appliance. Herein, the maxillary orthodontic appliance is the dental instrument as described in the above. The mandibular orthodontic appliance includes a mandibular shell-like body for accommodating mandibular teeth.

Further, the mandibular shell-like body includes a mandibular anterior region and a mandibular posterior region. The mandibular shell-like body is further provided with a mandibular support that enhances anchorage by using dental arch cortex. The mandibular support is provided in the mandibular anterior region.

Further, provided between the mandibular support and the mandibular anterior region is a mandibular gap separating the mandibular anterior region from the mandibular support.

An orthodontic system including a plurality of orthodontic appliance sets that include at least one orthodontic appliance set as described in the above. The plurality of orthodontic appliance sets have a geometric shape that gradually re-positions teeth from initial positions to target positions.

Further, the maxillary orthodontic appliance in the orthodontic appliance set provides anterior anchorage when the maxillary orthodontic appliance is the first orthodontic appliance. The maxillary orthodontic appliance coordinates with the mandibular orthodontic appliance so that both maxillary and mandibular teeth are synchronously adjusted to target positions for distal movement of both maxillary and mandibular posterior teeth. Then the maxillary orthodontic appliance in the orthodontic appliance set provides posterior anchorage when the maxillary orthodontic appliance is the second orthodontic appliance. The maxillary orthodontic appliance coordinates with the mandibular orthodontic appliance so that both maxillary and mandibular teeth are synchronously adjusted to target positions for adduction of both maxillary and mandibular anterior teeth.

In yet another aspect, some embodiments of the present disclosure provide an orthodontic system including a plurality of orthodontic appliance sets that include at least one orthodontic appliance set as described in the above. The plurality of orthodontic appliance sets have a geometric shape that gradually re-positions teeth from initial positions to target positions.

Further, the maxillary orthodontic appliance in the orthodontic appliance set provides anterior anchorage when the maxillary orthodontic appliance is the first orthodontic appliance. The maxillary orthodontic appliance coordinates with the mandibular orthodontic appliance so that both maxillary and mandibular teeth are synchronously adjusted to target positions for distal movement of both maxillary and mandibular posterior teeth. Then the maxillary orthodontic appliance set provides posterior anchoring when the maxillary orthodontic appliance is the second orthodontic appliance. The maxillary orthodontic appliance coordinates with the mandibular orthodontic appliance so that both maxillary and mandibular teeth are synchronously adjusted to target positions for adduction of both maxillary and mandibular anterior teeth.

In still a further aspect, some embodiments of the present disclosure provide a designing method of a first orthodontic appliance. The designing method includes steps of:

- obtaining a digital dental model, the digital dental model including a digital dental model body and a digital palate portion;
- designing, based on the digital dental model, an orthodontic appliance body allowing at least one tooth in a posterior region to move in a distal direction, the orthodontic appliance body including a shell-like orthodontic appliance body designed based on the digital dental model body and an auxiliary body designed based on the digital palate portion and connected to the shell-like orthodontic appliance body;
- providing on the auxiliary body an auxiliary anchoring portion that absorbs a reaction force generated in response to at least one tooth in a posterior region of the shell-like orthodontic appliance body moving in the distal direction, the auxiliary anchoring portion connected to a lingual side in the posterior region at both sides of the shell-like orthodontic appliance body; and
- providing an auxiliary transmitting portion auxiliary transmitting a reaction force generated by the at least one tooth in the posterior region while moving in the distal direction between an anterior region of the shell-like orthodontic appliance body and the auxiliary anchoring portion, or between the posterior region of the shell-like orthodontic appliance body and the auxiliary anchoring portion.

In one more aspect, some embodiments of the present disclosure provide a manufacturing method of the first orthodontic appliance. Herein, the first orthodontic appliance designed is manufactured based on the designing method described in the above. The manufacturing method includes: a manufacturing method of thermoforming and then cutting or a manufacturing method of direct 3D printing.

Herein, both the orthodontic appliance assisting posterior teeth to move in the distal direction and the orthodontic appliance holding the posterior teeth to stay unchanged in terms of relative positions may be manufactured in the manufacturing method of thermoforming and then cutting and/or the manufacturing method of direct 3D printing.

Compared with existing technologies, the present disclosure has following beneficial effects or advantages.

The present disclosure provides the first orthodontic appliance. The auxiliary anchoring portion and the auxiliary transmitting portion are provided in the shell-like body of the first orthodontic appliance. In this way, when the first orthodontic appliance is worn on maxillary teeth and moves posterior teeth in the distal direction, aided by the auxiliary transmitting portion, the reaction force generated from movement of the posterior teeth in the distal direction is totally or partially transmitted through the shell-like body to the auxiliary anchoring portion. Further, the reaction force is transmitted to the anterior region of the maxillary hard palate contacting the auxiliary anchoring portion. In this way, the anterior region of the maxillary hard palate is or partially is an anchorage of the anterior region. The reaction force is finally absorbed or partially absorbed by the maxillary hard palate. As a result, relative positions of the anterior teeth may be maintained, thereby preventing the anterior teeth from tilting to a labial side. The dental instrument provided includes the first orthodontic appliance and the second orthodontic appliance. Herein, the second orthodontic appliance is worn on the maxillary teeth after the first orthodontic appliance is off. In this way, after the anterior teeth are moved to target positions by the first orthodontic appliance, the second orthodontic appliance adducts the anterior teeth. Both left and right maxillary teeth in the posterior region integrally anchor to maintain positions of the posterior teeth unchanged. The orthodontic appliance set provided is able to treat both maxillary and mandibular teeth, and may synchronously use the first orthodontic appliance and the mandibular orthodontic appliance. Alternatively, the first orthodontic appliance and the second orthodontic appliance may be used in different periods, while coordinating with the mandibular orthodontic appliance. Selection may be based on what is needed in treatment. The orthodontic system provided includes a series of orthodontic appliance sets that are able to gradually move teeth in the posterior region in the distal direction while treating the teeth, so that the teeth are moved from initial positions to target positions.

In the designing method of the first orthodontic appliance provided by the present disclosure, the auxiliary anchoring portion and the auxiliary transmitting portion are provided on the orthodontic appliance body. When the orthodontic appliance body is worn on maxillary teeth and moves posterior teeth in the distal direction, aided by the auxiliary transmitting portion, the reaction force generated from movement of the posterior teeth in the distal direction is transmitted through the shell-like orthodontic appliance body to the auxiliary anchoring portion. The reaction force is absorbed or partially absorbed by the auxiliary anchoring portion. Anchorage to the anterior region is increased. As a result, relative positions of the anterior teeth may be maintained, thereby preventing the anterior teeth from tilting to a labial side. In the manufacturing method of the first orthodontic appliance provided by the present disclosure, after designing is performed using the above designing method, a corresponding orthodontic appliance is manufactured. Manufacturing methods include a manufacturing method of thermoforming and then cutting or a manufacturing method of direct 3D printing. Herein, the method of thermoforming and then cutting is easier. Manufacturing of the corresponding orthodontic appliance may be performed according to a patient's individual condition and request. Concerning the method of direct 3D printing, a structure that is complicated or hard to form may be directly printed, during which no artificial operation is required and thus accuracy may be well controlled.

Figure 1:
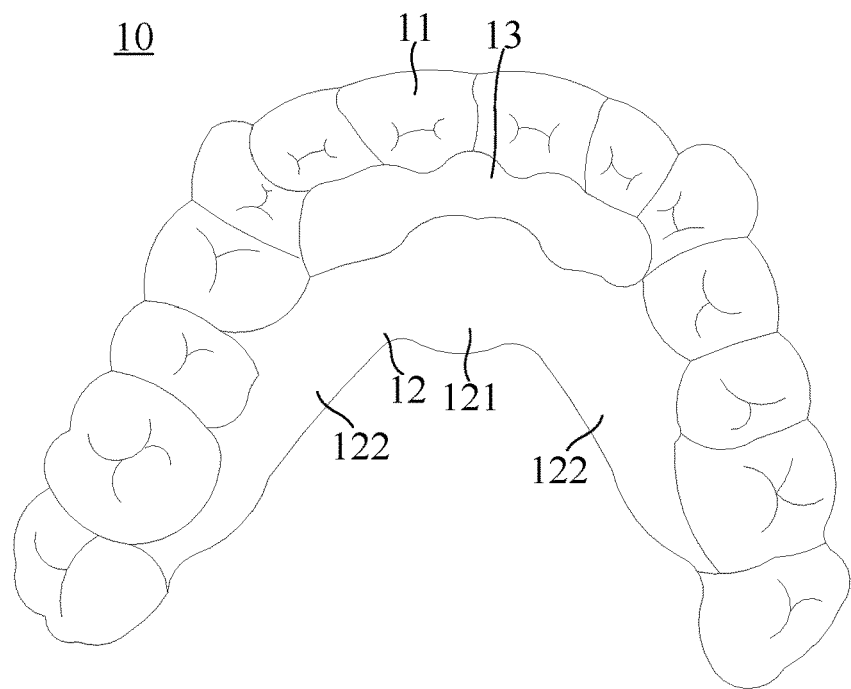
FIG. 1 is a bottom view of a first orthodontic appliance according to Embodiment 1 of the present disclosure.

Reference signs in the drawings: 10. first orthodontic appliance; 11. shell-like body (also named as orthodontic appliance body); 12. auxiliary anchoring portion; 121. anchorage body; 122. anchorage junction; 13. auxiliary transmitting portion; 20. second orthodontic appliance; 21. shell-like body; 22. holding portion; 221. reinforcing ridge; 30. mandibular orthodontic appliance; 31. mandibular shell-like body; 32. mandibular support; 33. mandibular gap.

DETAILED DESCRIPTION OF THE EMBODIMENTS

In order to make the purpose, technical solutions and advantages of the present disclosure clearer, the technical solutions in the embodiments of the present disclosure will be clearly and completely described below with reference to the accompanying drawings of the present disclosure. Obviously, the described embodiments are merely some rather than all embodiments of the present disclosure. Based on the embodiments in the present disclosure, all other embodiments obtained by those of ordinary skill in the art without inventive work fall within the protection scope of the present disclosure. Unless otherwise defined, technical or scientific terms used herein shall have ordinary meanings as understood by those of ordinary skills in the field to which the present disclosure belongs. As used herein, "comprising", "including" and similar words mean that the elements or things appearing before the word encompass the elements or things recited after the word and their equivalents, but do not exclude other elements or things.

In an orthodontic treatment, teeth are generally used for anchorage. The teeth for anchorage resist function of a reaction force generated from resisting an orthodontic force. Generally, the teeth for anchorage are not expected to move. When an invisible orthodontic appliance is applied to posterior teeth's movement in a distal direction, a reaction force generated from the movement stresses on anterior teeth. This would easily cause the anterior teeth to tilt towards a labial side. This would result in an unexpected treatment result. When an invisible orthodontic appliance is applied to anterior teeth's adduction, a reaction force generated from the movement stresses on the posterior teeth. This would cause the posterior teeth which have already moved to target positions to move in a mesial direction. This would also result in an unexpected treatment result. These have to be avoided in the orthodontic treatment. Therefore, when an invisible orthodontic appliance is applied to an orthodontic treatment, anchorage has to be added to moving teeth, so as to effectively avoid problems as described above.

Some embodiments of the present disclosure provide an orthodontic appliance including a first orthodontic appliance 10 and a second orthodontic appliance 20. The first orthodontic appliance 10 is configured to wear on maxillary teeth and move posterior teeth in the distal direction. When the posterior teeth are being moved in the distal direction, the first orthodontic appliance 10 is able to increase anchorage of the anterior teeth to maintain relative positions of the anterior teeth and prevent the anterior teeth from tilting towards the labial side. The second orthodontic appliance 20 is configured to wear on the maxillary teeth after the first orthodontic appliance 10 is off. The second orthodontic appliance 20 adducts the maxillary teeth in an anterior region. During this time, the second orthodontic appliance 20 is able to maintain positions of the posterior teeth, so that the posterior teeth stay in target orthodontic positions where the posterior teeth are when finishing wearing the first orthodontic appliance 10.

Referring to FIG. 1, Embodiment 1 of the present disclosure provides the first orthodontic appliance 10 including a shell-like body 11, an auxiliary anchoring portion 12 and an auxiliary transmitting portion 13.

The shell-like body 11 is provided with several cavities accommodating maxillary teeth, and is divided into an anterior region and a posterior region. The shell-like body 11 at least has a geometric structure allowing at least one tooth in the posterior region to move in the distal direction. Herein, the "posterior region" is defined according to classification of teeth in pages 36-38 of the $2^{nd}$ edition of "Introduction of Stomatology" published by the Peking University Medical Press. The posterior region includes premolars and molars, that is, teeth 4 to 8 as indicated by using a foreign direct investment (FDI) marking method. The "anterior region" includes teeth 1 to 3 as indicated by using the FDI marking method. The anterior region in the shell-like body 11 is capable of accommodating central incisors, lateral incisors and canines of the maxillary teeth. The posterior region in the shell-like body 11 is capable of accommodating first premolars, second premolars, first molars, second molars and third molars of the maxillary teeth.

An auxiliary anchoring portion 12 is provided on the shell-like body 11 and connected to a lingual side in the posterior region of both left and right sides of the shell-like body 11. When at least one tooth in the posterior region is moving in the distal direction, the auxiliary anchoring portion 12 is capable of absorbing a reaction force generated by the at least one tooth moving in the distal direction and transmitting the reaction force to an anterior region of a maxillary hard palate. In some embodiments of the present disclosure, the auxiliary anchoring portion 12 is connected to a gingival margin at the lingual side or a position close to the gingival margin at the lingual side in the posterior region at both the left and right sides of the shell-like body 11. Preferably, the position close to the gingival margin at the lingual side is a position ⅓-½ of a distance from a height of an entire tooth crown to the gingival margin. When the first orthodontic appliance 10 is being worn, the auxiliary anchoring portion 12 at the connecting position is able to reduce foreign body sensation in a patient's oral cavity and brings more comfortable wearing experience. The shell-like body 11 and the auxiliary anchoring portion 12 may be an integrally-formed structure or a non-integrally-formed structure. Herein, the shell-like body 11 and the auxiliary anchoring portion 12 may be an integrally-formed film lamination structure or a 3D-printed structure, or may be a non-integrally-formed structure formed through sticking, magnet, clamping or the like.

The auxiliary transmitting portion 13 is provided between the shell-like body 11 and the auxiliary anchoring portion 12, and is configured to aid transmission of the reaction force generated by the at least one tooth in the posterior region while moving in the distal direction. In this embodiment, the auxiliary transmitting portion 13 is provided between the anterior region of the shell-like body 11 and the auxiliary anchoring portion 12. In an example, the auxiliary transmitting portion 13 is a spacer hole provided between the shell-like body 11 and the auxiliary anchoring portion 12. The spacer hole partially separates the auxiliary anchoring portion 12 from the shell-like body 11. The auxiliary transmitting portion 13 is configured to transmit the reaction force generated by the at least one tooth in the posterior region while moving in the distal direction to the auxiliary anchoring portion 12. Besides, the auxiliary transmitting portion 13 is able to prevent the reaction force transmitted to the auxiliary anchoring portion 12 from being transmitted to the anterior region of the maxillary teeth. Further, the auxiliary transmitting portion 13, i.e., the spacer hole, is provided between a left canine and a right canine in the anterior region of the shell-like body 11. The auxiliary transmitting portion 13 has in a dental arch direction a length that is equal to a length of at least one tooth in the anterior region in a mesial-distal direction. The spacer hole having the structure is able to effectively separate the auxiliary anchoring portion 12 from the anterior region of the shell-like body 11, and effectively prevent the reaction force transmitted to the auxiliary anchoring portion 12 from being transmitted to the anterior region of the maxillary teeth.

When the first orthodontic appliance 10 is being worn on the maxillary teeth, the auxiliary anchoring portion 12 contacts a palatal mucosa of the anterior region of the maxillary hard palate. In this way, the anterior region of the maxillary hard palate serves as an anchorage for the anterior region or a partial anchorage for the anterior region, and the reaction force generated by the at least one tooth in the posterior region while moving in the distal direction is absorbed or partially absorbed by the maxillary hard palate. The maxillary hard palate is divided into an anterior region of the maxillary hard palate close to the labial side and a posterior region of the maxillary hard palate away from the labial side. In this embodiment, when the first orthodontic appliance 10 is being worn on the maxillary teeth, the auxiliary anchoring portion 12 extends to the anterior region of the maxillary hard palate and contacts the palatal mucosa of the anterior region of the maxillary hard palate.

In particular, when the first orthodontic appliance 10 is being worn on the maxillary teeth, the geometric structure of the shell-like body 11 allows at least one tooth in the posterior region to move in the distal direction. The at least one tooth moving in the distal direction generates in an opposite direction a reaction force equal to the orthodontic force of the shell-like body 11. The reaction force is totally or partially transmitted through the shell-like body 11 to the auxiliary anchoring portion 12. The auxiliary anchoring portion 12 totally or partially absorbs the reaction force, and transmits the reaction force to the anterior region of the maxillary hard palate contacting the auxiliary anchoring portion 12. In this way, the anterior region of the maxillary hard palate is or partially is an anchorage of the anterior region, and thus anchorage to the anterior region is increased. The reaction force generated while the at least one tooth in the posterior region is moving in the distal direction is finally absorbed or partially absorbed by the maxillary hard palate. As a result, relative positions of anterior teeth may be maintained, thereby preventing the anterior teeth from tilting to the labial side.

Referring to FIG. 1, the auxiliary anchoring portion 12 includes an anchorage body 121 provided in the anterior region of the maxillary hard palate and anchorage junctions 122 respectively connected with left and right sides of the shell-like body 11, and the left and right sides of the shell-like body 11 are respectively provided with at least one of the anchorage junctions 122. In the first orthodontic appliance 10 shown in FIG. 1, the anchorage body 121 is a film generally oval in shape. At least one of the anchorage junctions 122 is arranged on the left and right sides respectively. Each of the anchorage junctions 122 is connected between the anchorage body 121 and the shell-like body 11. The anchorage junctions 122 are able to transmit the reaction force generated by the at least one tooth in the posterior region while moving in the distal direction to the anchorage body 121.

Figure 2:
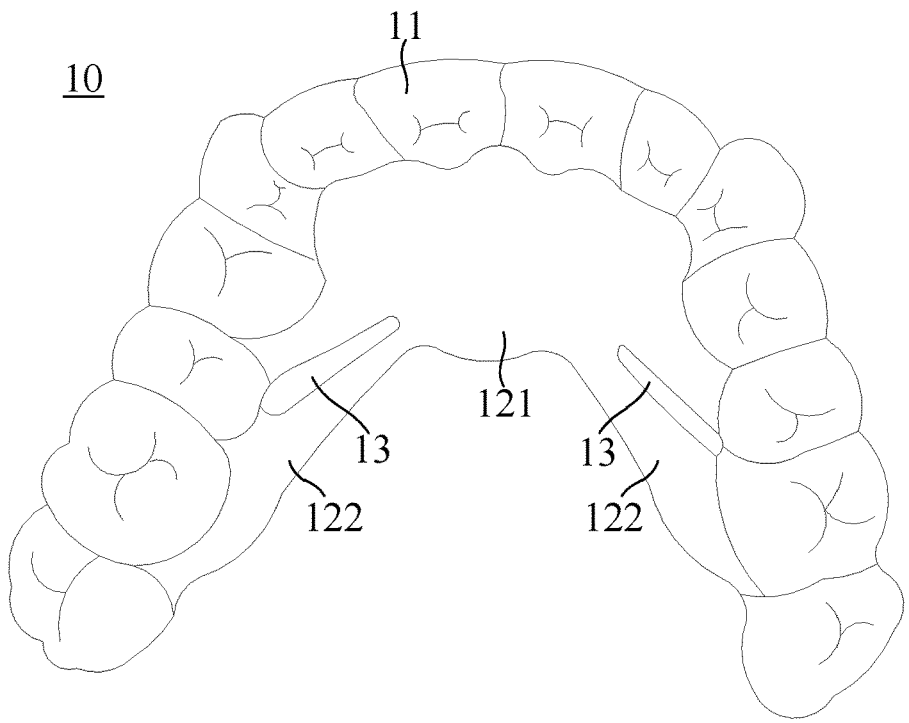
FIG. 2 is a bottom view of a first orthodontic appliance according to Embodiment 2 of the present disclosure.

Referring to FIG. 2, the first orthodontic appliance 10 in Embodiment 2 has a similar structure with the first orthodontic appliance 10 in Embodiment 1. They are different in that in Embodiment 2, the auxiliary transmitting portion 13 is provided between the posterior region in the shell-like body 11 and the auxiliary anchoring portion 12. In an example, the auxiliary transmitting portion 13 is a spacer hole provided between the shell-like body 11 and the auxiliary anchoring portion 12. The spacer hole partially separates the auxiliary anchoring portion 12 from the shell-like body 11. In FIG. 2, the auxiliary transmitting portion 13, i.e., the spacer hole, is provided between the posterior region in the shell-like body 11 and the auxiliary anchoring portion 12. The auxiliary anchoring portion 12 is also connected to the anterior region in the shell-like body 11. When the reaction force generated while the at least one tooth in the posterior region is moving in the distal direction is transmitted in the mesial direction, aided by the auxiliary transmitting portion 13, the reaction force is totally or partially transmitted through the shell-like body 11 to the auxiliary anchoring portion 12. The auxiliary anchoring portion 12 totally or partially absorbs the reaction force, and transmits the reaction force to the anterior region of the maxillary hard palate contacting the auxiliary anchoring portion 12. In this way, anchorage to the anterior region is increased. As a result, relative positions of anterior teeth may be maintained during movement of the posterior teeth in the distal direction, thereby preventing the anterior teeth from tilting to the labial side.

Figure 3:
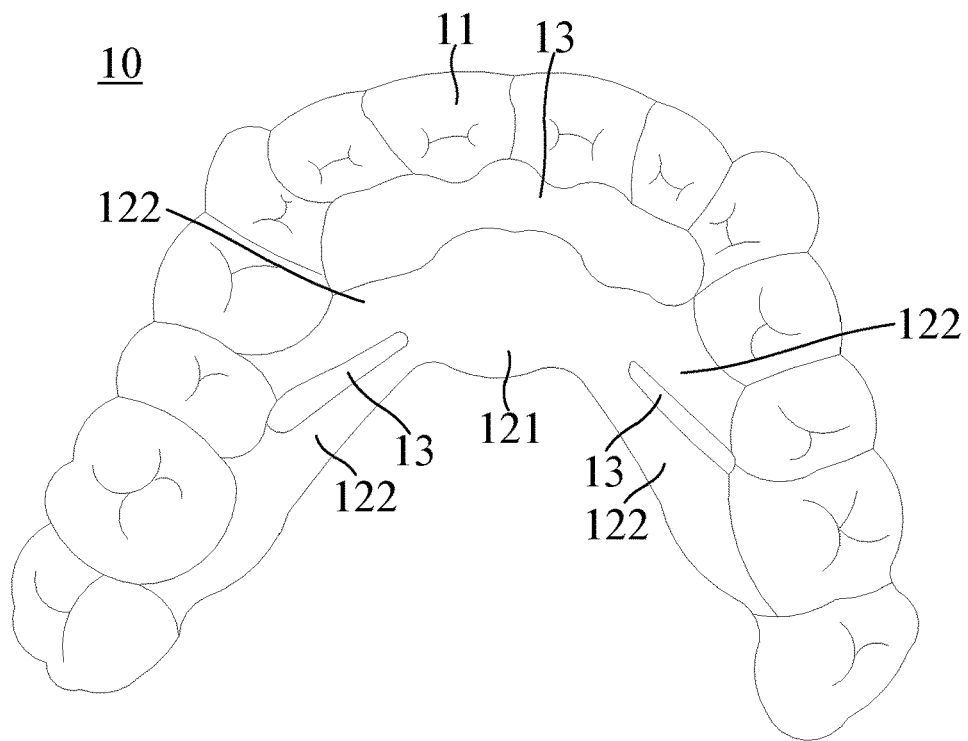
FIG. 3 is a bottom view of a first orthodontic appliance according to Embodiment 3 of the present disclosure.

Referring to FIG. 3, concerning the first orthodontic appliance 10 in Embodiment 3, when there are a plurality of anchorage junctions 122 connected to the left side of the shell-like body 11 and/or a plurality of anchorage junctions 122 connected to the right side of the shell-like body 11, a spacer hole between the anchorage junctions 122 is the auxiliary transmitting portion 13. In this embodiment, the anchorage body 121 is connected to the left side of the shell-like body 11 through two anchorage junctions 122. Provided between the two anchorage junctions 122 is a spacer hole. The spacer hole is an auxiliary transmitting portion 13 on the left side. The anchorage body 121 is connected to the right side of the shell-like body 11 through two anchorage junctions 122. Provided between the two anchorage junctions 122 on the right is a spacer hole. The spacer hole is an auxiliary transmitting portion 13 on the right side. In addition, concerning the first orthodontic appliance 10 in this embodiment, an auxiliary transmitting portion 13 of a spacer hole structure is provided between the anchorage body 121 and the anterior region of the shell-like body 11. The auxiliary transmitting portion 13 has an identical or similar structure with the auxiliary transmitting portion 13 in the first orthodontic appliance 10 in Embodiment 1. The first orthodontic appliance 10 in this embodiment, aided by the auxiliary anchoring portion 12 and the auxiliary transmitting portion 13, is able to transmit the reaction force generated while the at least one tooth in the posterior region is moving in the distal direction to the anterior region of the maxillary hard palate contacting the auxiliary anchoring portion 12. This manner is similar with the manner of the first orthodontic appliance 10 in Embodiment 1 and Embodiment 2, and thus is not repeated herein.

The more anchorage junctions 122 connected to the left and right sides of the shell-like body 11 there are, the more advantageous it is for the transmission of the reaction force. However, an increasing number of the anchorage junctions 122 would cause a smaller connection width between the anchorage junctions 122 and the shell-like body 11. Anchorage junctions 122 with an excessively small connection width are not advantageous for transmission of the reaction force. In some embodiments of the present disclosure, the connection width between the anchorage junctions 122 and the shell-like body 11 is greater than or equal to 2 mm. That is, the connection width at the gingival margin at the lingual side or a connection width close to the gingival margin at the lingual side between the anchorage junctions 122 and the shell-like body 11 is greater than or equal to 2 mm. In this way, the auxiliary anchoring portion 12 has good capability in force transaction.

The number of the anchorage junctions 122 at the left side of the shell-like body 11 may be identical with or different from the number of the anchorage junctions 122 at the right side of the shell-like body 11. The number of the auxiliary transmitting portion 13 at the left side of the shell-like body 11 may be identical with or different from the number of the auxiliary transmitting portion 13 at the right side of the shell-like body 11.

Figure 4:
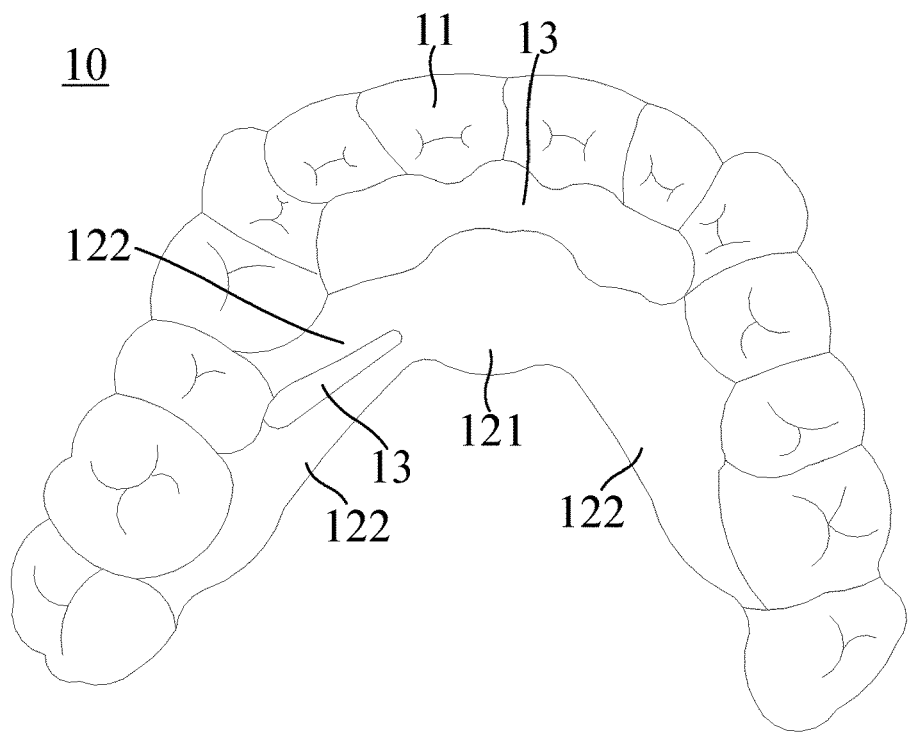
FIG. 4 is a bottom view of a first orthodontic appliance according to Embodiment 4 of the present disclosure.

Referring to FIG. 4, concerning the first orthodontic appliance 10 in Embodiment 4, the anchorage body 121 is connected to the posterior region at the left side of the shell-like body 11 through two anchorage junctions 122. An auxiliary transmitting portion 13 of the spacer hole structure is provided between the two anchorage junctions 122 at the left side. The anchorage body 121 is connected to the posterior region at the right side of the shell-like body 11 through one anchorage junction 122. An auxiliary transmitting portion 13 of the spacer hole structure is further provided between the anchorage body 121 and the anterior region in the shell-like body 11. The first orthodontic appliance 10 in this embodiment is also able to transmit the reaction force generated while the at least one tooth in the posterior region is moving in the distal direction to the anterior region of the maxillary hard palate contacting the auxiliary anchoring portion 12, which is not repeated herein.

Figure 5:
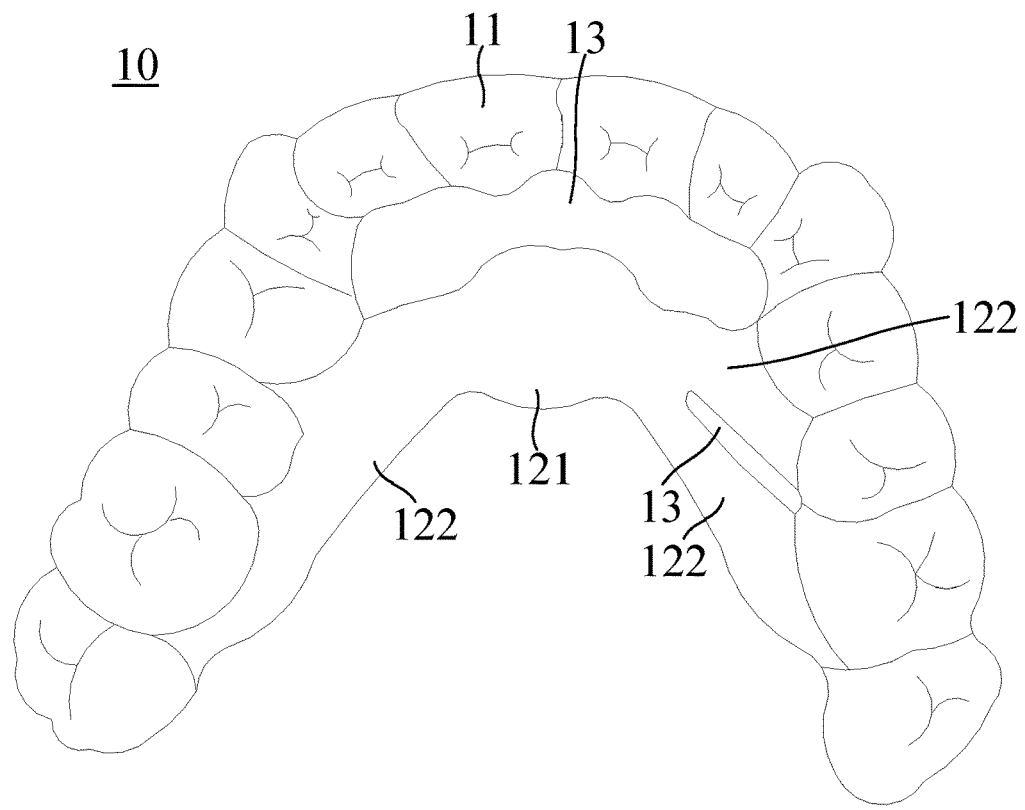
FIG. 5 is a bottom view of a first orthodontic appliance according to Embodiment 5 of the present disclosure.

Referring to FIG. 5, concerning the first orthodontic appliance 10 in Embodiment 5, the anchorage body 121 is connected to the posterior region at the left side of the shell-like body 11 through one anchorage junction 122. The anchorage body 121 is connected to the posterior region at the right side of the shell-like body 11 through two anchorage junctions 122. An auxiliary transmitting portion 13 having the spacer hole structure is provided between the two anchorage junctions 122. An auxiliary transmitting portion 13 of the spacer hole structure is further provided between the anchorage body 121 and the anterior region in the shell-like body 11. The first orthodontic appliance 10 in this embodiment is also able to transmit the reaction force generated while the at least one tooth in the posterior region is moving in the distal direction to the anterior region of the maxillary hard palate contacting the auxiliary anchoring portion 12, which is not repeated herein.

In some embodiments of the present disclosure, a surface of the anchorage body 121 facing the anterior region of the maxillary hard palate is adapted to a surface shape of the anterior region of the maxillary hard palate, and the surface shape adaptation may be in the form of convex-concave matching. That is, a shape of the anchorage body 121 and a shape of the anterior region of the maxillary hard palate match in a convex-concave manner. This makes more fit and more comfortable wearing of the orthodontic appliances, and is advantageous for transmission of the reaction force and increase of anchoring.

Figure 6:
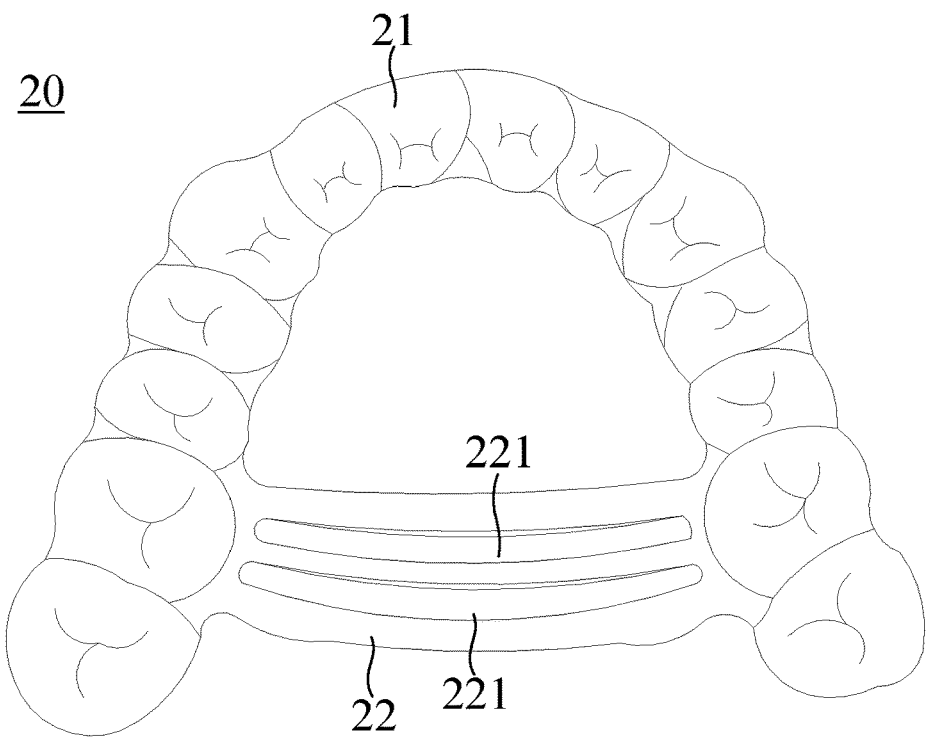
FIG. 6 is a bottom view of a second orthodontic appliance according to Embodiment 6 of the present disclosure.

Referring to FIG. 6, Embodiment 6 of the present disclosure provides a second orthodontic appliance 20 including a shell-like body 21 and a holding portion 22.

The shell-like body 21 is provided with several cavities accommodating maxillary teeth, and is divided into an anterior region and a posterior region. The shell-like body 21 has a geometric structure adducting anterior teeth. The anterior region in the shell-like body 21 is capable of accommodating central incisors, lateral incisors and canines of the maxillary teeth. The posterior region in the shell-like body 21 is capable of accommodating first premolars, second premolars, first molars, second molars and third molars of the maxillary teeth.

The holding portion 22 is separately connected to a lingual side in a posterior region of both left and right sides of the shell-like body 21, and the second orthodontic appliance 20 is worn on the maxillary teeth after the first orthodontic appliance 10 is off, so that in response to adduction of the anterior teeth, both left and right maxillary teeth in the posterior region integrally anchorage, and the left and right maxillary teeth in the posterior region move to right positions that are unchanged.

Specifically, after the first orthodontic appliance 10 is worn and off, maxillary teeth at both left and right sides of the posterior region move in the distal direction to right positions. Then, when the second orthodontic appliance 20 is worn on the maxillary teeth, the geometric structure of the shell-like body 21 generates an orthodontic force that adducts the anterior teeth. During adduction, the anterior teeth generate in an opposite direction a reaction force equal to the orthodontic force of the shell-like body 21. The reaction force is transmitted through the shell-like body 21 to the posterior teeth, and makes the posterior teeth tend to move in the mesial direction. The holding function of the holding portion 22 maintains unchanged positions of maxillary teeth at both the right and left sides of the posterior region that integrally act as anchorage. This reduces or removes effect of the reaction force generated from adduction of the anterior teeth on the maxillary teeth at both the right and left sides of the posterior region, and maintains unchanged positions of the posterior teeth.

In some embodiments of the present disclosure, the holding portion 22 is separately connected to the gingival margin at the lingual side or the position close to the gingival margin at the lingual side in the posterior region at both the left and right sides of the shell-like body 21. The position close to the gingival margin at the lingual side is the position ⅓-½ of the distance from the height of the entire tooth crown to the gingival margin. The holding portion 22 at the connecting position is able to reduce foreign body sensation in a patient's oral cavity and brings more comfortable wearing experience. Preferably, a length of connection between the holding portion 22 and the shell-like body 21 is equal to a length of a second premolar and a first molar of the shell-like body 21 in the mesial-distal direction, so that there is a good connection strength between the holding portion 22 and the shell-like body 21. Not only does the holding portion have a good holding force, but the connection length reduces foreign body sensation in the patient's oral cavity and brings more comfortable wearing experience. The shell-like body 21 and the holding portion 22 may be an integrally-formed structure or a non-integrally-formed structure. Herein, the shell-like body 21 and the holding portion 22 may be an integrally-formed film lamination structure or a 3D-printed structure, or may be a non-integrally-formed structure formed through sticking, magnet, clamping or the like.

In some embodiments of the present disclosure, the holding portion 22 is an arch structure having a radian consistent with a radian of an upper palate. When performing adduction on the maxillary teeth in the anterior region, stress generated from compression of arch of the holding portion 22 has a cortex anchorage effect on a maxillary posterior arch. This can effectively reduce or remove the reaction force generated from adduction of the anterior teeth and applied to the posterior teeth, so that relative positions of posterior teeth is maintained while the anterior teeth are being adducted.

Figure 7A:
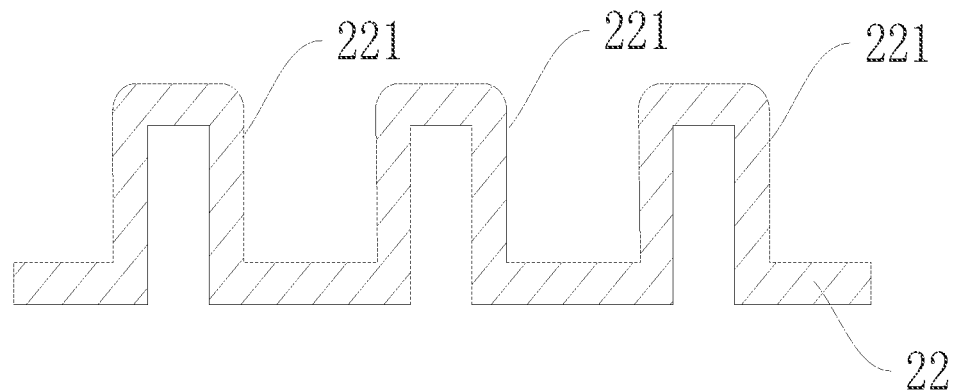
FIG. 7A is a schematic diagram showing a section of a holding portion of a second orthodontic appliance along a mesial-distal direction of a sagittal plane according to an embodiment of the present disclosure.
Figure 7B:
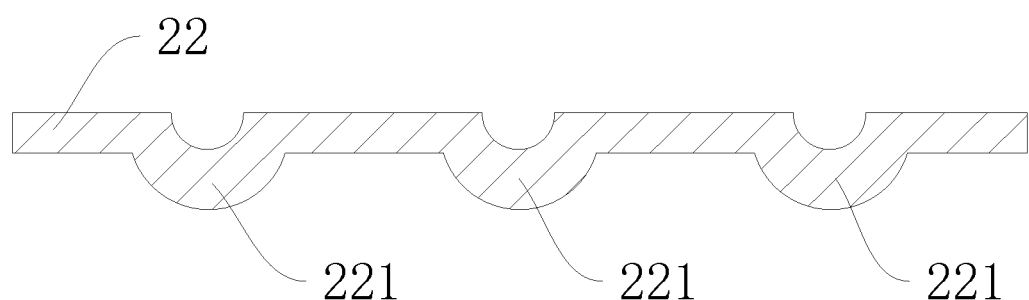
FIG. 7B is a schematic diagram showing a section of a holding portion of a second orthodontic appliance along a mesial-distal direction of a sagittal plane according to another embodiment of the present disclosure.
Figure 7C:
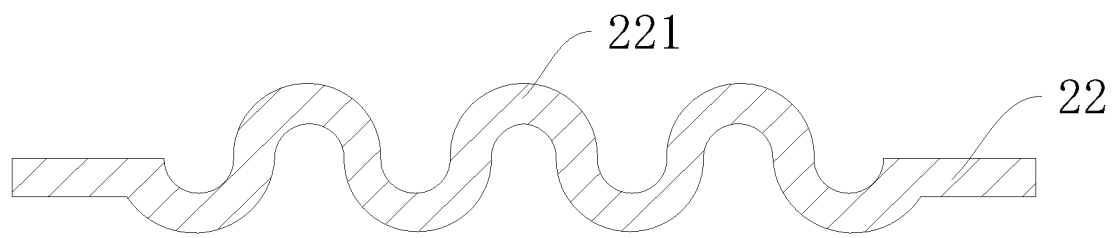
FIG. 7C is a schematic diagram showing a section of a holding portion of a second orthodontic appliance along a mesial-distal direction of a sagittal plane according to still another embodiment of the present disclosure.

In some embodiments of the present disclosure, referring to FIG. 7A to FIG. 7C, a reinforcing portion for increasing stability is provided on the holding portion 22. Preferably, the strengthening portion is at least one reinforcing ridge 221 buccolingually provided and having a curvature consistent with or different from a curvature of the holding portion 22. The reinforcing portion increases stability of the holding portion 22, and has an improved capability of resisting the reaction force generated from the adduction of the anterior teeth and maintaining positions of the anterior teeth unchanged.

Referring to FIG. 7A to FIG. 7C, a section of the reinforcing ridge 221 along a mesial-distal direction of a sagittal plane may be a discontinuous section or a continuous section. When the section is a discontinuous section, as examples, the section of the holding portion along the mesial-distal direction of the sagittal plane as shown in FIG. 7A includes a plurality of separated U-shaped sections, and the section of the holding portion along the mesial-distal direction of the sagittal plane as shown in FIG. 7B includes a plurality of separated arc sections. When the section is a continuous section, as an example, FIG. 7C shows the section of the holding portion along the mesial-distal direction of the sagittal plane is formed by a plurality of arc sections with their ends connected. Any adjacent two arc sections are connected smoothly to form a continuous wave section. The section of the reinforcing ridge 221 along the mesial-distal direction is provided above and below, above, or below the section of the holding portion 22. As shown in FIG. 7A, the section of the reinforcing ridge 221 along the mesial-distal direction is provided above the section of the holding portion 22. As shown in FIG. 7B, the section of the reinforcing ridge 221 in the mesial-distal direction is provided below the section of the holding portion 22. As shown in FIG. 7C, the section of the reinforcing ridge 221 in the mesial-distal direction is provided above and below the section of the holding portion 22. These varied manners improve stability of the holding portion 22 and capability of maintaining positions of the anterior teeth unchanged. Preferably, the section of the reinforcing ridge 221 along the mesial-distal direction is an arc or a closed polygon. The reinforcing ridge 221 of the structure is able to effectively improve stress generated from compression of arch of the holding portion 22, and is able to reduce or remove the reaction force generated from adduction of the anterior teeth.

Some embodiments of the present disclosure further provide an orthodontic system. The orthodontic system includes a plurality of orthodontic appliance sets having a geometric shape that gradually positions teeth from initial positions to target positions. One orthodontic appliance set in this embodiment is described in detail in the following.

The orthodontic appliance set includes a maxillary orthodontic appliance and a mandibular orthodontic appliance 30. The maxillary orthodontic appliance is the first orthodontic appliance 10 and the second orthodontic appliance 20 according in the above Embodiments 1 to 6. The mandibular orthodontic appliance 30 includes a mandibular shell-like body 31 for accommodating mandibular teeth. The mandibular shell-like body 31 may be of a geometric structure allowing at least one mandibular tooth in the posterior region to move in the distal direction. The maxillary orthodontic appliance and the mandibular orthodontic appliance coordinate to separately treat the maxillary teeth and the mandibular teeth.

Figure 8:
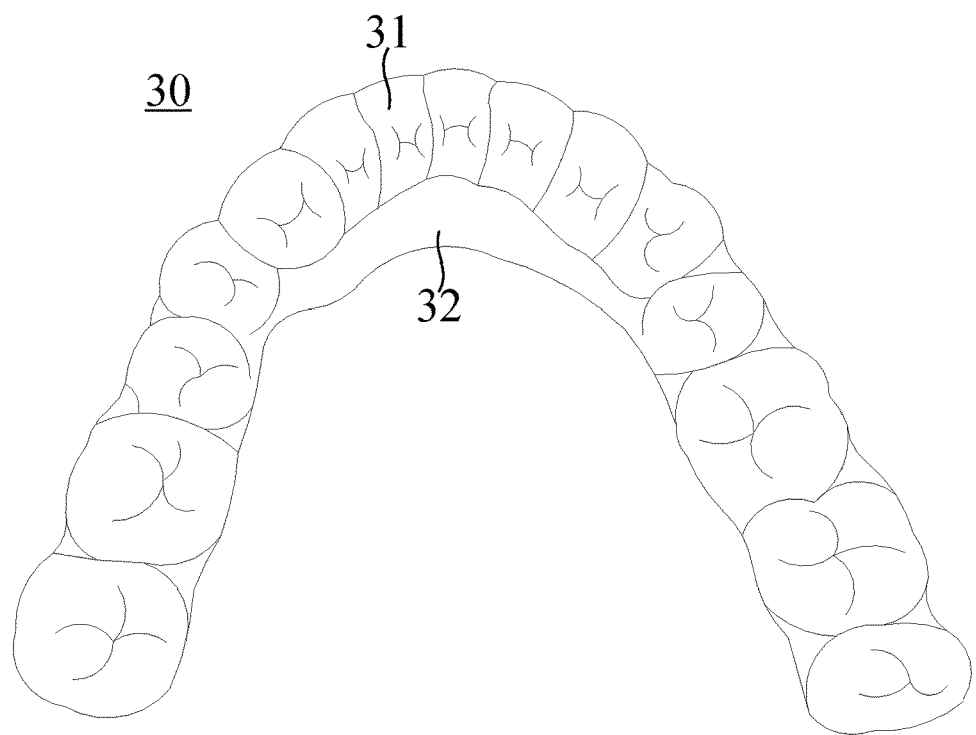
FIG. 8 is a top view of a mandibular orthodontic appliance according to Embodiment 7 of the present disclosure.

Referring to FIG. 8, in the mandibular orthodontic appliance 30 of Embodiment 7, the mandibular shell-like body 31 includes a mandibular anterior region and a mandibular posterior region. The mandibular anterior region of the mandibular shell-like body 31 is capable of accommodating central incisors, lateral incisors and canines of the mandibular teeth. The posterior region in the mandibular shell-like body 31 is capable of accommodating first premolars, second premolars, first molars, second molars and third molars of the mandibular teeth.

The mandibular shell-like body 31 is further provided with a mandibular support 32 that enhances anchoring by using dental arch cortex, the mandibular support 32 provided in the mandibular anterior region. In this embodiment, the mandibular support 32 is connected to a lingual side in the anterior region of the mandibular shell-like body 31. The mandibular support 32 is generally a plate or sheet structure. When the maxillary orthodontic appliance and the mandibular orthodontic appliance coordinate to separately treat the maxillary teeth and the mandibular teeth, the first orthodontic appliance 10 as the maxillary orthodontic appliance moves the maxillary teeth in the posterior region in the distal direction. All or part of the reaction force generated from the movement is transmitted through the auxiliary anchoring portion 12 provided on the shell-like body 11 of the first orthodontic appliance 10 to the anterior region of the maxillary hard palate, so that the reaction force is partially or totally absorbed. The mandibular orthodontic appliance 30 moves the mandibular teeth in the posterior region to the distal direction. At least one tooth moving in the distal direction generates in an opposite direction a reaction force equal to the orthodontic force of the mandibular shell-like body 31. The reaction force makes the mandibular teeth in the anterior region have a tendency of tilting to the labial side. With anchoring of dental arch cortex, the mandibular support 32 on the mandibular shell-like body 31 reduces or removes the reaction force transmitted to the anterior region of the mandibular shell-like body 31 while the mandibular teeth in the posterior region are moving in the distal direction. The mandibular support 32 increases anchorage by the mandibular orthodontic appliance 30 while the mandibular teeth in the posterior region are moving to the distal direction. As a result, relative positions of the mandibular teeth in the anterior region are maintained, thereby preventing the mandibular teeth in the anterior region from tilting to the labial side.

Figure 9:
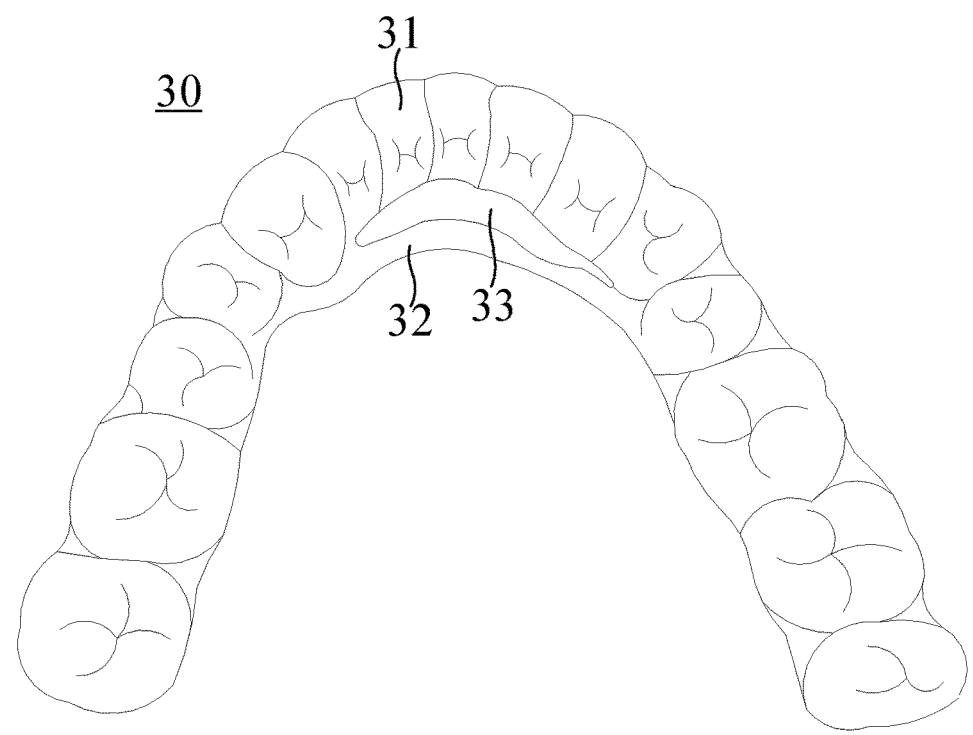
FIG. 9 is a top view of a mandibular orthodontic appliance according to Embodiment 8 of the present disclosure.

Referring to FIG. 9, a mandibular orthodontic appliance 30 in Embodiment 8 has a structure similar to the structure of the mandibular orthodontic appliance 30 in Embodiment 7. The difference is that in the mandibular orthodontic appliance 30 in Embodiment 8, a mandibular gap 33 is further provided between the mandibular support 32 and the mandibular teeth in the anterior region. The mandibular gap 33 separates the mandibular teeth in the anterior region from the mandibular support 32. The mandibular support 32 in this embodiment is generally of a rod structure. The mandibular support 32 of the rod structure may also increase anchoring by the mandibular orthodontic appliance 30 while the mandibular teeth in the posterior region are moving in the distal direction. As a result, relative positions of the mandibular teeth in the anterior region are maintained, thereby preventing the mandibular teeth in the anterior region from tilting to the labial side.

In some embodiments of the present disclosure, a plurality of varied orthodontic appliance sets are able to gradually move teeth from initial positions to target positions. Herein, each orthodontic appliance set includes both the maxillary orthodontic appliance and the mandibular orthodontic appliance 30 in Embodiment 7 and Embodiment 8, so that the maxillary teeth and the mandibular teeth are treated synchronously. The initial positions are relative positions in a digital model collected for a patient. The target positions are positions of a final result of the treatment by a doctor and a medical designer according to the patient's condition and request. Due to difference between individuals, patients have different oral conditions. Teeth are to be gradually moved from the initial positions to the target positions, during which a series of varied orthodontic appliance sets are required to treat the teeth. For a patient requesting posterior teeth to be moved in the distal direction, when an orthodontic appliance set is being worn, a reaction force generated while the maxillary teeth in the posterior region are moving in the distal direction is totally or partially transmitted, aided by the auxiliary transmitting portion 13, through the shell-like body 11 to the auxiliary anchoring portion 12. The reaction force is further transmitted to the anterior region of the maxillary hard palate contacting the auxiliary anchoring portion 12. In this way, the anterior region of the maxillary hard palate acts as an anterior anchorage or a partial anterior anchorage. The reaction force is finally absorbed or partially absorbed by the maxillary hard palate, so that the relative positions of the anterior teeth may be maintained, thereby preventing the maxillary teeth in the anterior region from tilting to the labial side. Besides, the mandibular support 32 increases anchoring by the mandibular orthodontic appliance 30 while the mandibular teeth in the posterior region are moving in the distal direction. As a result, relative positions of the mandibular teeth in the anterior region are maintained, thereby preventing the mandibular teeth in the anterior region from tilting to the labial side.

Some embodiments of the present disclosure further provide another orthodontic system. The orthodontic system includes a plurality of orthodontic appliance sets having a geometric shape that gradually re-positions teeth from initial positions to target positions. One orthodontic appliance set in this embodiment is described in detail in the following.

The orthodontic appliance set includes a maxillary orthodontic appliance and a mandibular orthodontic appliance 30. The maxillary orthodontic appliance is the dental instrument in the above embodiments. The dental instrument includes a first orthodontic appliance 10 and a second orthodontic appliance 20. The mandibular orthodontic appliance 30 includes a mandibular shell-like body 31 for accommodating the maxillary teeth. The maxillary orthodontic appliance and the mandibular orthodontic appliance coordinate to separately treat the maxillary teeth and the mandibular teeth. The mandibular shell-like body 31 may be the mandibular orthodontic appliance 30 in Embodiments 7 and 8, and is not repeated.

In some embodiments of the present disclosure, a plurality of varied orthodontic appliance sets are able to gradually move teeth from initial positions to target positions. Herein, each orthodontic appliance set includes both the maxillary orthodontic appliance and the mandibular orthodontic appliance 30 in Embodiment 7 and Embodiment 8, so that the maxillary teeth and the mandibular teeth are treated synchronously. The initial positions are relative positions in a digital model collected for a patient. The target positions are positions of a final result of the treatment by a doctor and a medical designer according to the patient's condition and request. Due to difference between individuals, patients have different oral conditions. Teeth are to be gradually moved from the initial positions to the target positions, during which a series of varied orthodontic appliance sets are required to treat the teeth. For a patient requesting posterior teeth to be moved in the distal direction and anterior teeth to be adducted to the lingual side, when one orthodontic appliance set is being worn, the first orthodontic appliance 10 is worn on the maxillary teeth in the first place so that a reaction force generated while the maxillary teeth in the posterior region are moving in the distal direction is totally or partially transmitted, aided by the auxiliary transmitting portion 13, through the shell-like body 11 to the auxiliary anchoring portion 12. The reaction force is further transmitted to the anterior region of the maxillary hard palate contacting the auxiliary anchoring portion 12. In this way, the anterior region of the maxillary hard palate acts as an anterior anchorage or a partial anterior anchorage. The reaction force is finally absorbed or partially absorbed by the maxillary hard palate, so that the relative positions of the anterior teeth may be maintained, thereby preventing the maxillary teeth in the anterior region from tilting to the labial side. Besides, the mandibular support 32 increases anchoring by the mandibular orthodontic appliance 30 while the mandibular teeth in the posterior region are moving in the distal direction. As a result, relative positions of the mandibular teeth in the anterior region are maintained, thereby preventing the mandibular teeth in the anterior region from tilting to the labial side. When the maxillary teeth in the posterior region are moved in place, the second orthodontic appliance 20 is worn on the maxillary teeth, so that the anterior teeth are adducted after the first orthodontic appliance 10 are moved in place by moving in the distal direction. The teeth on the left and right sides of the maxillary teeth in the posterior region as an integrally anchorage to maintain positions of the posterior teeth unchanged.

In the orthodontic system in the above two embodiments, the maxillary orthodontic appliance provides anterior anchorage when the maxillary orthodontic appliance is the first orthodontic appliance 10. The maxillary orthodontic appliance and the mandibular orthodontic appliance 30 coordinate to synchronously adjust the maxillary and mandibular teeth to the target position of distal movement of the maxillary and mandibular teeth. Preferably, the mandibular orthodontic appliance 30 that moves the posterior teeth in the distal direction is the mandibular orthodontic appliance 30 having the mandibular support 32 in Embodiments 7 and 8, so as to increase anterior teeth anchorage. Then, the maxillary orthodontic appliance in the orthodontic appliance set provides anterior anchoring when the maxillary orthodontic appliance is the second orthodontic appliance 20. The maxillary orthodontic appliance and the mandibular orthodontic appliance 30 coordinate to synchronously adjust the maxillary and mandibular teeth to the target positions after adduction of the maxillary and mandibular teeth in the anterior region. Preferably, the mandibular orthodontic appliance 30 that adducts the anterior teeth is an orthodontic appliance normally worn which is, for example, the mandibular orthodontic appliance 30 without the mandibular support 32.

Figure 10:
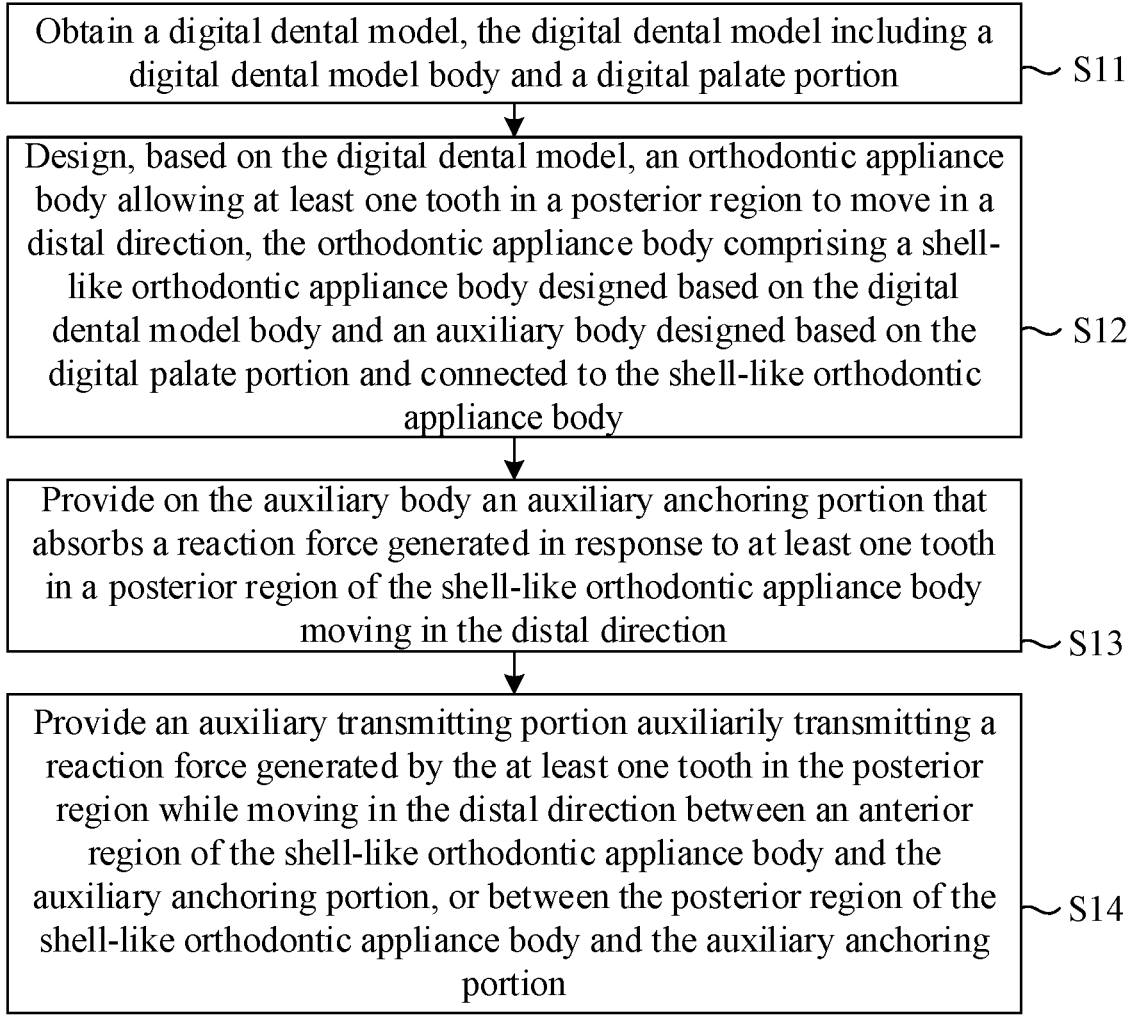
FIG. 10 is a flowchart of a designing method of a first orthodontic appliance according to Embodiment 9 of the present disclosure.

FIG. 10 is a flowchart of a designing method of a first orthodontic appliance according to Embodiment 9 of the present disclosure, including steps of S11 to S14.

S11: obtain a digital dental model, and the digital dental model including a digital dental model body and a digital palate portion.

Herein, the digital dental model may be a maxillary digital dental model which may be obtained through initial dental information, or may be obtained through intermediate-state dental information during treatment. Herein, the initial dental information or the intermediate-state dental information may be obtained through oral scanning or scanning of a user's dental model. The initial dental information may specifically include a dental shape, a gingiva position and the like, and may further include tooth root information obtained from cone beam computed tomography (CBCT) data. The dental shape further includes such shapes as a labial surface, a lingual surface and an occlusal plane. Further, the dental shape may include a cusp, a ridge, a pit and a groove of teeth.

S12: design, based on the digital dental model, an orthodontic appliance body allowing at least one tooth in a posterior region to move in a distal direction. The orthodontic appliance body includes a shell-like orthodontic appliance body 11 (i.e., a shell-like body; shell-like orthodontic appliance body and shell-like body have the same reference and may replace each other in this text) designed based on the digital dental model body and an auxiliary body designed based on the digital palate portion and connected to the shell-like orthodontic appliance body 11.

Design the orthodontic appliance body may specifically be to design a digital orthodontic appliance body or an entity orthodontic appliance body. Herein, the digital orthodontic appliance body may be to use the finite element analysis (FEA) method to design a special component on a virtual digital orthodontic appliance. The entity orthodontic appliance body may be used for designing for an entity after the digital dental model is thermoformed, that is, to perform special cutting on a thermoformed orthodontic appliance.

The shell-like orthodontic appliance body 11 may be provided with several cavities accommodating maxillary teeth, and is divided into an anterior region and a posterior region. Preferably, the shell-like orthodontic appliance body 11 is provided to at least have a geometric structure allowing at least one tooth in the posterior region to move in the distal direction. Herein, the "posterior region" is defined according to classification of teeth in pages 36-38 of the 2$^{nd}$ edition of "Introduction of Stomatology" published by the Peking University Medical Press. The posterior region includes premolars and molars, that is, teeth 4 to 8 as indicated by using the FDI marking method. The "anterior region" includes teeth 1 to 3 as indicated by using the FDI marking method. The anterior region in the shell-like orthodontic appliance body 11 is capable of accommodating central incisors, lateral incisors and canines of the maxillary teeth. The posterior region in the shell-like orthodontic appliance body 11 is capable of accommodating first premolars, second premolars, first molars, second molars and third molars of the maxillary teeth.

S13: provide on the auxiliary body an auxiliary anchoring portion 12 that absorbs a reaction force generated when at least one tooth in a posterior region of the shell-like orthodontic appliance body 11 moving in the distal direction. The auxiliary anchoring portion 12 is connected to a lingual side in the posterior region at both sides of the shell-like orthodontic appliance body 11.

In some embodiments of the present disclosure, a position where the auxiliary anchoring portion 12 is connected to the posterior region of both sides of the shell-like orthodontic appliance body 11 is provided at a gingival margin at the lingual side or a position close to the gingival margin at the lingual side in the posterior region. The position close to the gingival margin at the lingual side is a position ⅓-½ of a distance from a height of an entire tooth crown to the gingival margin. When the orthodontic appliance body is being worn, the auxiliary anchoring portion 12 at the connecting position is able to reduce foreign body sensation in a patient's oral cavity and brings more comfortable wearing experience. The shell-like orthodontic appliance body 11 and the auxiliary anchoring portion 12 may be designed as an integrally-formed structure or a non-integrally-formed structure. Herein, the shell-like orthodontic appliance body 11 and the auxiliary anchoring portion 12 may be an integrally-formed film lamination structure or a 3D-printed structure, or may be a non-integrally-formed structure formed through sticking, magnet, clamping or the like.

A maxillary hard palate is divided into an anterior region of the maxillary hard palate close to a labial side and a posterior region of the maxillary hard palate away from the labial side. In some embodiments of the present disclosure, the auxiliary anchoring portion 12 is designed as having the following features. When the orthodontic appliance body is being worn on the maxillary teeth, the auxiliary anchoring portion 12 contacts a palatal mucosa of the anterior region of the maxillary hard palate. A reaction force that is generated while the at least one tooth in the posterior region is moving in the distal direction and that is absorbed by the auxiliary anchoring portion 12 is can be transmitted to the anterior region of the maxillary hard palate contacting the auxiliary anchoring portion 12. The reaction force is finally absorbed by the maxillary hard palate, so that the anterior region of the maxillary hard palate acts as an anchorage for the anterior region or a partial anchorage for the anterior region. Therefore, anchoring to the anterior region is increased.

S14: provide an auxiliary transmitting portion 13 auxiliarily transmitting a reaction force generated by the at least one tooth in the posterior region while moving in the distal direction between an anterior region of the shell-like orthodontic appliance body 11 and the auxiliary anchoring portion 12, or between the posterior region of the shell-like orthodontic appliance body 11 and the auxiliary anchoring portion 12.

In some embodiments of the present disclosure, the auxiliary transmitting portion 13 is designed as a spacer hole provided between the shell-like orthodontic appliance body 11 and the auxiliary anchoring portion 12, the spacer hole partially separating the auxiliary anchoring portion 12 from the shell-like orthodontic appliance body 11.

Some embodiments of the present disclosure further provide a manufacturing method of the orthodontic appliance. Manufacturing is correspondingly performed based on the orthodontic appliance designed in the above designing method. The manufacturing method includes: a manufacturing method of thermoforming and then cutting or a manufacturing method of direct 3D printing.

Some embodiments of the present disclosure further provide a manufacturing method based on the first orthodontic appliance. Both the orthodontic appliance assisting posterior teeth to move in the distal direction and the orthodontic appliance holding the posterior teeth to stay unchanged in terms of relative positions may be manufactured in the manufacturing method of thermoforming and cutting and/or the manufacturing method of direct 3D printing.

In one implementation, a manufacturing module in the manufacturing method may be an additive manufacturing machine. To manufacture an orthodontic appliance by using the additive manufacturing machine is to directly print the orthodontic appliance from a finite element digital model of the orthodontic appliance obtained as required by using the 3D printing technology. The 3D printing technology may be the the stereo lithography apparatus (SLA) or the digital light projection (DLP).

In another implementation, the a manufacturing module of the manufacturing method may further be a 3D printing device, a laminating device, a cutting device, a polishing device, or a cleaning and disinfection device. The manufacturing method is as follows. Firstly, the 3D printing technology is used to directly print a finite element digital model of a digital dental model as required. Then lamination is performed on a printed 3D dental model. Finally, such operations as cutting, polishing, cleaning and disinfection are performed a laminated orthodontic appliance to obtain a completed orthodontic appliance.

Although the embodiments of the present disclosure are described above in detail, it is apparent to those skilled in the art that various modifications and changes may be made to these embodiments. However, it should be understood that such modifications and changes are within the scope and spirit of the present disclosure as set forth in the claims. Furthermore, the present disclosure described herein may have other embodiments and may be implemented or realized in multiple manners.

What is claimed is:

1. A first orthodontic appliance, comprising a shell-like body provided with several cavities accommodating maxillary teeth and at least having a geometric structure configured to generate an orthodontic force to move at least one tooth in a posterior region in a distal direction from an initial position to a target position; wherein
the shell-like body is further provided with an auxiliary anchoring portion capable of absorbing a reaction force generated by the at least one tooth in the posterior region while moving in the distal direction, the reaction force and the orthodontic force are equal in magnitude and opposite in direction, the auxiliary anchoring portion connected to a lingual side at the posterior region of both left and right sides of the shell-like body;
provided between the shell-like body and the auxiliary anchoring portion is an auxiliary transmitting portion used for aiding transmission of the reaction force generated by the at least one tooth in the posterior region while moving in the distal direction, the auxiliary transmitting portion provided between an anterior region of the shell-like body and the auxiliary anchoring portion, or the auxiliary transmitting portion provided between the posterior region of the shell-like body and the auxiliary anchoring portion;
in response to the first orthodontic appliance being worn on the maxillary teeth, the auxiliary anchoring portion is in contact with a palatal mucosa of an anterior region of a maxillary hard palate so that the anterior region of the maxillary hard palate serves as an anchorage for an anterior region or a partial anchorage for the anterior region, and the reaction force generated by the at least one tooth in the posterior region while moving in the distal direction is absorbed or partially absorbed by the maxillary hard palate.

2. The first orthodontic appliance according to claim 1, wherein the auxiliary transmitting portion is a spacer hole provided between the shell-like body and the auxiliary anchoring portion, the spacer hole partially separating the auxiliary anchoring portion from the shell-like body.

3. The first orthodontic appliance according to claim 2, wherein the shell-like body comprises the anterior region of the shell-like body and the posterior region of the shell-like body, the auxiliary transmitting portion is provided between a left canine and a right canine in the anterior region of the shell-like body, and the auxiliary transmitting portion has in a dental arch direction a length that is equal to a length of at least one tooth in the anterior region in a mesial-distal direction.

4. The first orthodontic appliance according to claim 1, wherein the auxiliary anchoring portion comprises an anchorage body provided in the anterior region of the maxillary hard palate and anchorage junctions respectively connected with left and right sides of the shell-like body, and the left and right sides are respectively provided with at least one of the anchorage junctions.

5. The first orthodontic appliance according to claim 4, wherein in response to there being a plurality of anchorage junctions connected to the left side of the shell-like body and/or a plurality of anchorage junctions connected to the right side of the shell-like body, a spacer hole between the anchorage junctions is the auxiliary transmitting portion.

6. The first orthodontic appliance according to claim 5, wherein a width of connection between each anchorage junction and the shell-like body is greater than or equal to 2 mm.

7. The first orthodontic appliance according to claim 4, wherein the anchorage body has a surface at a side facing the anterior region of the maxillary hard palate, the surface being shaped as adaptive to a surface of the anterior region of the maxillary hard palate.

8. The first orthodontic appliance according to claim 1, wherein the auxiliary anchoring portion is adapted to be attached to a gingival margin at the lingual side or a position close to the gingival margin at the lingual side in the posterior region at both the left and right sides of the shell-like body.

9. The first orthodontic appliance according to claim 1, wherein the shell-like body and the auxiliary anchoring portion are an integrally-formed structure or a non-integrally-formed structure.

10. A dental instrument, comprising the first orthodontic appliance according to claim 1 and a second orthodontic appliance; wherein
the second orthodontic appliance comprises a shell-like body and a holding portion, and the shell-like body is provided with several cavities accommodating maxillary teeth and has a geometric structure adducting anterior teeth; the holding portion is separately connected to a lingual side in a posterior region of both left and right sides of the shell-like body, and the second orthodontic appliance is worn on the maxillary teeth after the first orthodontic appliance is off, so that in response to adduction of the anterior teeth, both left and right maxillary teeth in the posterior region integrally anchor, and the left and right maxillary teeth in the posterior region move to right positions and stay unchanged.

11. The dental instrument according to claim 10, wherein the holding portion is adapted to be attached to the gingival margin at the lingual side or the position close to the gingival margin at the lingual side in the posterior region at both the left and right sides of the shell-like body.

12. The dental instrument according to claim 10, wherein the holding portion is an arch structure having a radian consistent with a radian of an upper palate.

13. The dental instrument according to claim 12, wherein a reinforcing portion for increasing stability is provided on the holding portion.

14. The dental instrument according to claim 13, wherein the reinforcing portion is at least one reinforcing ridge arranged along buccolingually direction and having a curvature consistent with or different from a curvature of the holding portion.

15. The dental instrument according to claim 14, wherein a section of the reinforcing ridge along a mesial-distal direction of a sagittal plane is a discontinuous section or a continuous section.

16. The dental instrument according to claim 15, wherein a section of a cross section of the reinforcing ridge in the mesial-distal direction is provided above and below a cross section of the holding portion, or is provided above the cross section of the holding portion, or is provided below the cross section of the holding portion.

17. The dental instrument according to claim 10, wherein a length of connection between the holding portion and the shell-like body is equal to a length of a second premolar and a first molar of the shell-like body in the mesial-distal direction.

18. A designing method of a first orthodontic appliance, comprising:
    obtaining a digital dental model, the digital dental model comprising a digital dental model body and a digital palate portion;
    designing, based on the digital dental model, an orthodontic appliance body configured to generate an orthodontic force to move at least one tooth in a posterior region in a distal direction from an initial position to a target position, the orthodontic appliance body comprising a shell-like orthodontic appliance body designed based on the digital dental model body and an auxiliary body designed based on the digital palate portion and connected to the shell-like orthodontic appliance body;
    providing on the auxiliary body an auxiliary anchoring portion that absorbs a reaction force generated in response to at least one tooth in a posterior region of the shell-like orthodontic appliance body moving in the distal direction, the reaction force and the orthodontic force are equal in magnitude and opposite in direction, the auxiliary anchoring portion connected to a lingual side in the posterior region at both sides of the shell-like orthodontic appliance body; and
    providing an auxiliary transmitting portion configured for auxiliary transmission of a reaction force generated by the at least one tooth in the posterior region while moving in the distal direction between an anterior region of the shell-like orthodontic appliance body and the auxiliary anchoring portion, or between the posterior region of the shell-like orthodontic appliance body and the auxiliary anchoring portion.

* * * * *